(12) United States Patent
Stoner

(10) Patent No.: US 6,837,380 B2
(45) Date of Patent: Jan. 4, 2005

(54) LOW CLEARANCE DUAL-SCREEN PARTICLE SORTER

(76) Inventor: Randall K. Stoner, 23100 Lauren La., Edmond, OK (US) 73003

( * ) Notice: Subject to any disclaimer, the term of this patent is extended or adjusted under 35 U.S.C. 154(b) by 161 days.

(21) Appl. No.: 10/186,000

(22) Filed: Jun. 28, 2002

(65) Prior Publication Data

US 2003/0029699 A1 Feb. 13, 2003

Related U.S. Application Data

(60) Provisional application No. 60/302,324, filed on Jun. 28, 2001.

(51) Int. Cl.[7] ................................................. B07B 1/00
(52) U.S. Cl. ......................... 209/264; 209/240; 209/263
(58) Field of Search ................................. 209/311, 313, 209/326, 331, 366, 366.5, 240, 241, 245, 263, 264

(56) References Cited

U.S. PATENT DOCUMENTS 1,052,946 A * 2/1913 Otis ........................... 209/355
1,501,047 A * 7/1924 Vincent Hall ................ 209/329
4,155,840 A * 5/1979 Gauld et al. .................. 209/245
4,576,713 A * 3/1986 Melin ........................... 209/254
4,906,356 A * 3/1990 Musschoot .................... 209/261
5,100,539 A * 3/1992 Tsutsumi ....................... 209/240

* cited by examiner

*Primary Examiner*—Donald P. Walsh
*Assistant Examiner*—Joseph C Rodriguez
(74) *Attorney, Agent, or Firm*—Crowe & Dunlevy, P.C.

(57) ABSTRACT

An apparatus for sorting particles of a material such as concrete. The apparatus includes a frame and a drive assembly attached to the frame to induce gyroscopic vibratory motion of the frame in a selected rotational direction. Adjacent first and second inclined screens are affixed to the frame. The screens slope downwardly away from an intermediate ridge at different, respective first and second angles. Material dropped onto the intermediate ridge separates into a first stream which passes along the first inclined screen and a second stream which passes along the second inclined screen. The first and second angles are selected in relation to the vibratory motion of the frame so that the first and second streams each move at substantially the same velocity. A diverter member at the intermediate ridge aids in the transition of material flow along the respective screens.

3 Claims, 5 Drawing Sheets

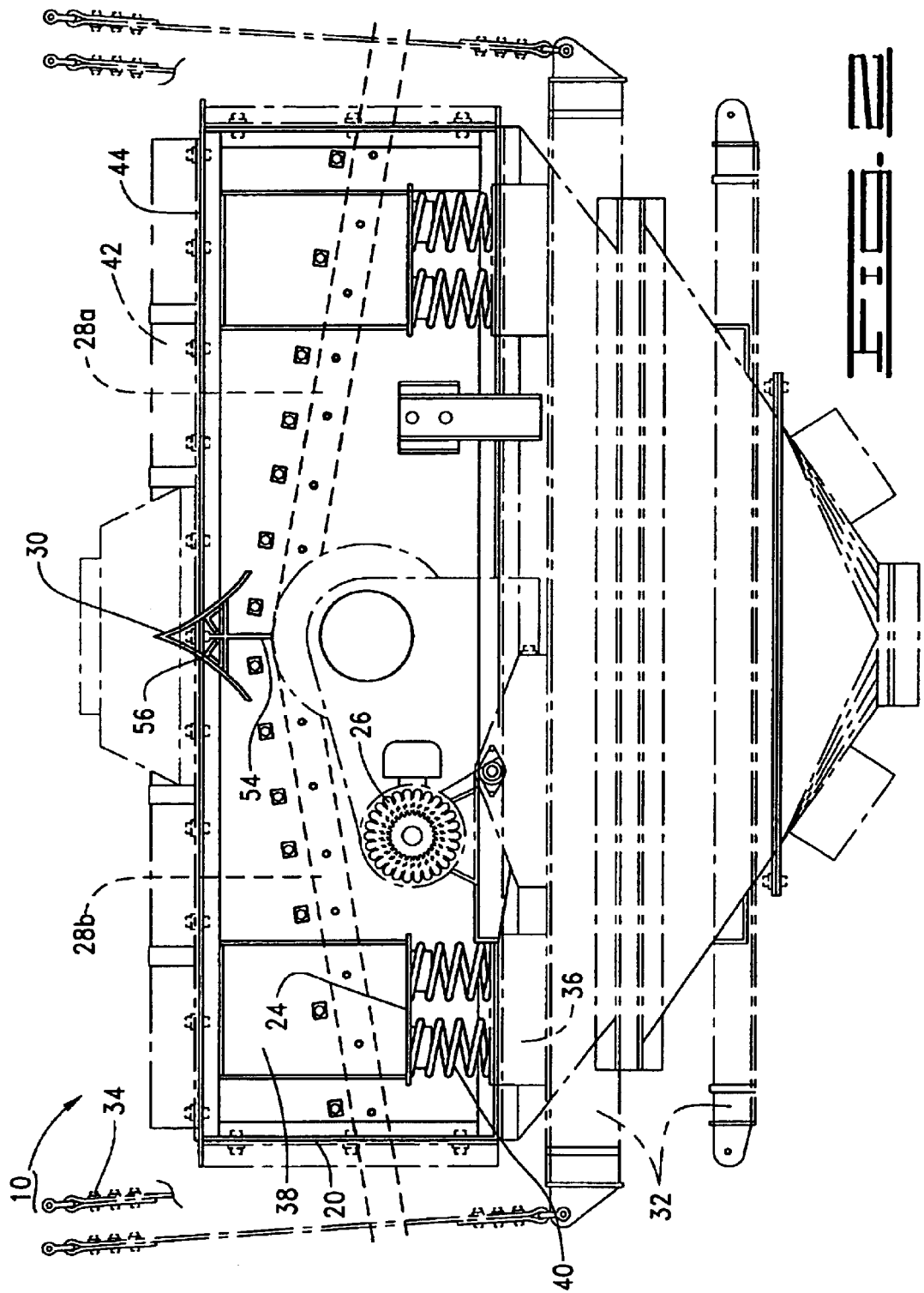

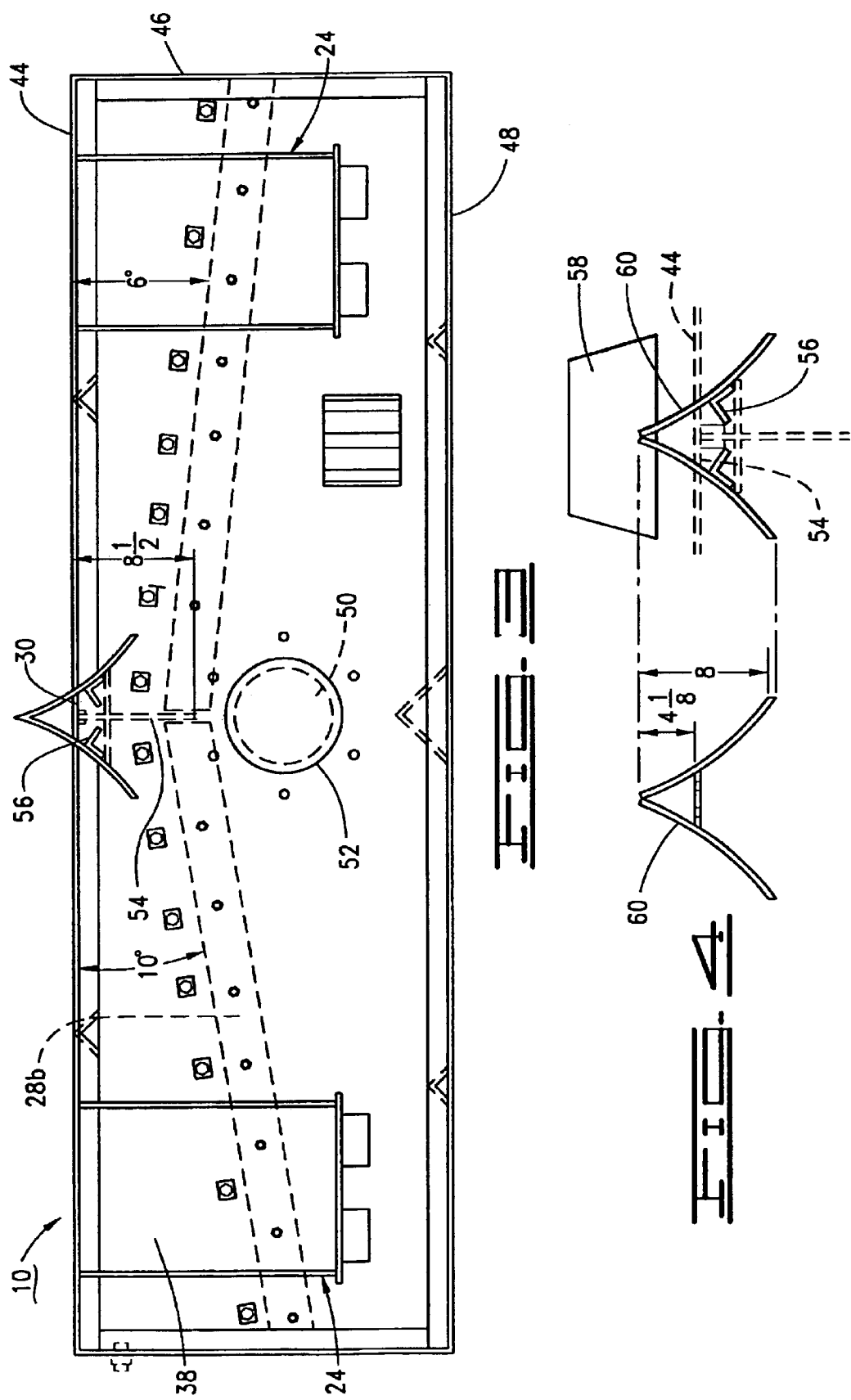

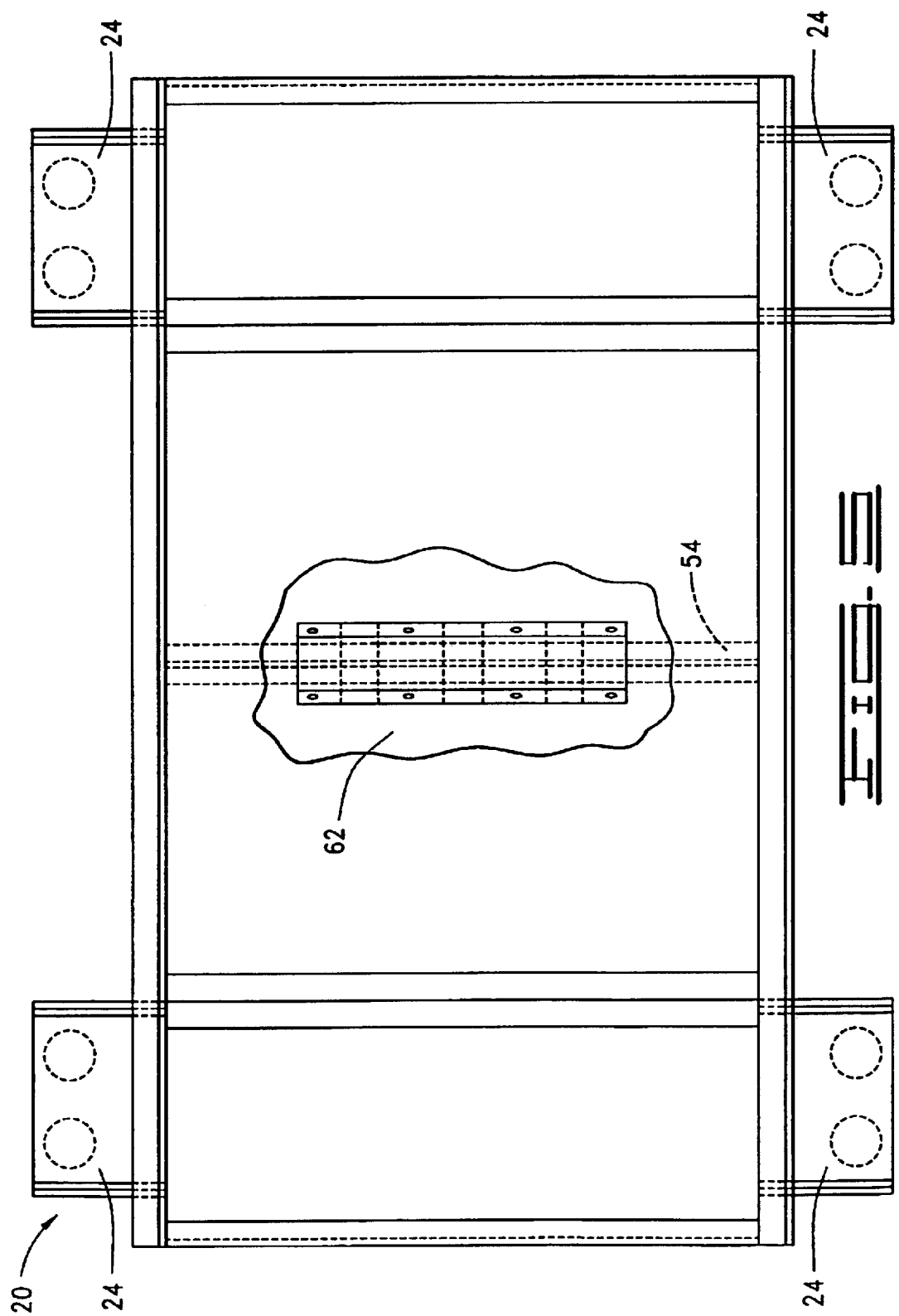

US 6,837,380 B2

LOW CLEARANCE DUAL-SCREEN PARTICLE SORTER

RELATED APPLICATION

This application claims the benefit of U.S. Provisional Application No. 60/302,324, filed Jun. 28, 2001.

FIELD OF THE INVENTION

This invention relates generally to the field of material sorting devices, and more particularly, but not by way of limitation, to an apparatus which sorts particles of a material by motorized vibration of a pair of inclined screens.

BACKGROUND

Sorting equipment of the type intended for sorting and separating particles of a material (also sometimes referred to as a "shaker table") usually include a stand, a frame movably suspended on the stand, an inclined elongated screen of usually approximately four to eight feet mounted on the frame, and one or more motors mounted on the frame for vibrating the frame and attached screen. The screen has a number of apertures of selected size (such as ½ inch).

A material is deposited on the upper end of the inclined vibrating screen. As the material is advanced down the screen by the vibratory motion thereof, smaller particles having diameters less than the size of the screen apertures fall through the screen while larger particles having diameters greater than screen apertures pass along the length of the screen.

Such equipment finds broad application in a number of industrial areas. For example, an aggregate of granulated cement material can be processed so that smaller, useful particles are passed on for subsequent use and larger "clumps" (formed from the undesired addition of water to the aggregate) are discarded.

Although such sorting systems perform their intended functions well, it has become apparent in many applications that a single screen is inefficient and as well as poorly suited to situations with clearance or topography restrictions.

Thus, there is a need for improvements in the art directed to the sorting of particles of a material that overcomes these and other limitations of the prior art.

SUMMARY OF THE INVENTION

An apparatus for sorting particles of a material includes a frame, a drive assembly, and adjacent first and second inclined screens affixed to the frame. The drive assembly is attached to the frame to induce gyroscopic vibratory motion of the frame in a selected rotational direction. The screens each slope downwardly away from an intermediate ridge. The first inclined screen extends at a first angle with respect to a horizontal plane and the second inclined screen extends at a different, second angle with respect to the horizontal plane.

Material dropped onto the intermediate ridge separates into a first stream passing along the first inclined screen and a second stream passing along the second inclined screen. The first and second angles are selected in relation to the vibratory motion of the frame so that the first and second streams each move at substantially the same velocity along the respective first and second inclined screens.

The intermediate ridge comprises a diverter member with opposing first and second radiused surfaces to transition the flow of the material from an initial substantially vertical flow into the respective first and second streams.

BRIEF DESCRIPTION OF THE DRAWINGS

FIG. 2 is a partial cross-sectional view of the apparatus of FIG. 1.

FIG. 3 is a partial cross-sectional side view of a frame apparatus.

FIG. 4 is a partial cross-sectional side view of a diverter member of the apparatus.

FIG. 5 is a top view of the apparatus.

DETAILED DESCRIPTION

Figure 1:
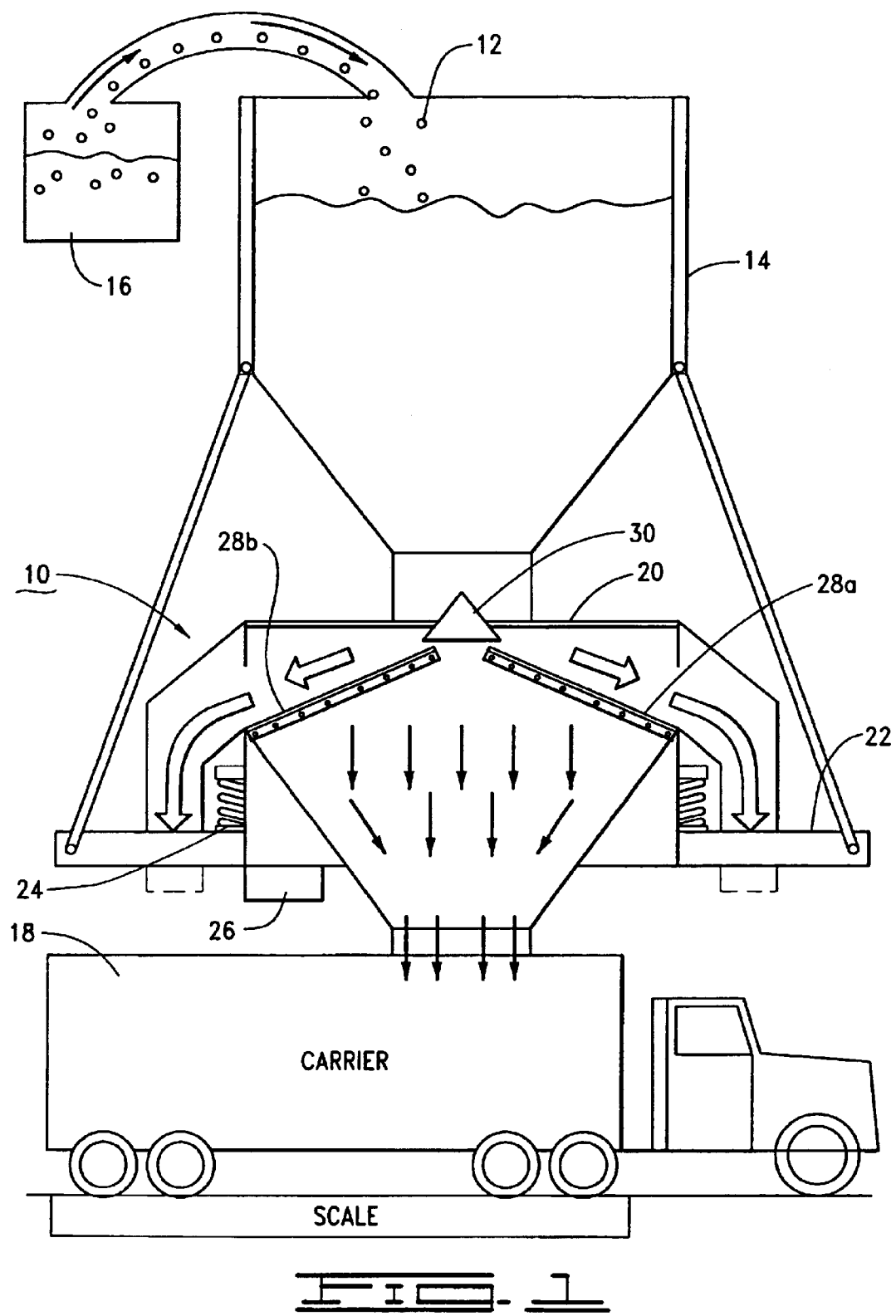
FIG. 1 is a perspective view of a dual-screen particle sorting apparatus constructed and operated in accordance with preferred embodiments of the present invention.

Referring to the drawings in general, and more particularly to FIG. 1, shown therein is a view of a dual-screen particle sorting apparatus 10 (herein also referred to as the "apparatus" and "dual-screen sorter") constructed in accordance with preferred embodiments of the present invention.

The dual-screen sorter 10 receives material 12 from a silo 14 that can come from a source 16, such as a bulk storage facility. The material 12 is separated and passed on to a carrier 18 to be used on site or transported to another location. The dual-screen sorter 10 includes a frame 20 held in a stand 22, a plurality of suspension assemblies 24, a vibrator motor 26, a pair of screens 28a, 28b and a diverter member 30.

In a preferred embodiment the material comprises granulated cement. Due to the undesired adsorption of water or other liquids during transit or storage, "clumps" of cement may be formed within the material. Thus as described below, the dual-screen sorter 10 operates to screen, or filter out such clumps that are larger than an acceptable size as determined by the apertures through the screens 28a, 28b (such as ½ inch diameter). The particular configuration of the dual-screen sorter 10 allows the sorter to be located in the relatively restrictive clearance space between the silo 14 and the carrier vehicle 18.

The stand 22 includes a generally rectangular-shaped base portion 32 and upright portions 34 shown in FIG. 2. The frame 20 is generally rectangular-shaped and is movably suspended on the stand by the plurality of suspension assemblies 24. More specifically, each suspension assembly 24 includes a bottom spring pad 36 and a top spring pad 38 mounted on the frame 20 and vertically aligned with spring pad 36. A coil spring 40 is captured between each aligned pair of spring pads 36, 38 for movably suspending the frame 20 on the stand 22. The dual-screen sorter 10 has a lid 42 with an opening capable of accepting the nozzle of the silo 14 or other material carrier, such as a conveyor.

FIG. 3 shows a partial cross-section of the side of the frame 20 without the drive assembly or stand 22 to make the frame 20 easier to see. The frame has a frame top 44, body 46 and bottom 48. The screens 28a, 28b of this embodiment are suitable for dry sorting operations and have more than one screen or screen face. The screens, 28a, 28b are removably mounted on the frame body 46 and supported within the frame 20. The screens 28a, 28b of this embodiment are pretensioned framed screens, although other types of screens can be used if desired. The screens 28a, 28b in this embodiment are each approximately four feet in length and four feet wide and are slightly arched (approximately 3 degrees) to improve sorting efficiency. Also shown in FIG. 3 is a drive shaft 50 in the shaft opening 52.

FIG. 4 shows the diverter device 30 which includes an upper support structure 54 suspended from the frame top 44 that supports deflector supports 56 and an arcuate deflector 60. The diverter device 30 is located below a nozzle 58. The arcuate deflector 60 is mounted on the frame 20 by the deflector supports 56 that are supported by the upper support 54 as shown in partial cross-section. The inlet opening in this embodiment, which is directly below the nozzle 58, is circular with a radius of about 4 feet cut in the lid 42 of the dual-screen sorter 10. The arcuate deflector 60 is sized to allow the maximum expected particle size, specific to the application, to pass into the dual-screen sorter 10 through the space between the arcuate deflector 60 and the circumference of the opening.

The arcuate deflector 60 also is built to have a specific shape with a specific camber to maximize the sorting efficiencies. In this embodiment the arcuate deflector is angled to transition from an approximate vertical direction to a direction that approximates the slope of the screens 28a, 28b. The size and camber of the arcuate deflector 60 is preferably selected to achieve efficient and cost effective sorting on the dual-screen sorter 10, and to minimize velocity reductions in the material as the material transitions from a vertical drop path to inclined travel across and through the screens 28a, 28b.

FIG. 5 shows a top view of the frame 20 showing the suspension assemblies 24 and the inlet opening 62 that will be cut in the lid 42. Also shown is the upper support 54 of the diverter device 30, which supports the arcuate deflector 60 in the position that allows the dual-screen sorter 10 to operate efficiently.

Figure 6:
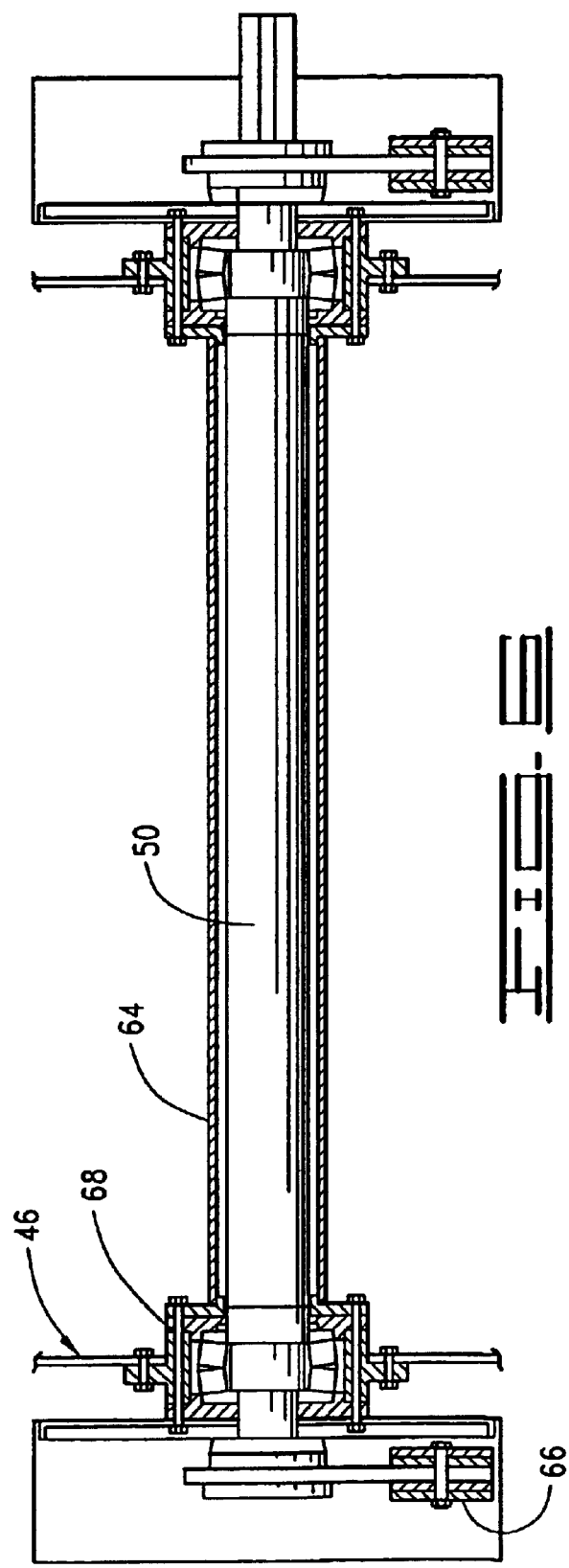
FIG. 6 is a partial cross-sectional view of a drive assembly of the apparatus.

The drive assembly is shown in FIG. 6. The motor (not shown) is mounted on a motor base, which in turn is attached to the frame 20, so that the drive shaft 50 of the motor is positioned horizontally, and extends transversely with respect to the frame 20. The motor 26 is of the type, which is well known in the sorting equipment art, and transmits a gyroscopic, generally horizontal vibrating motion to the frame through the motor base and the frame 20. An example of a suitable motor which could be used with the dual-screen sorter 10 is the rotary electric vibrator motor manufactured by SMICO, Inc. of Oklahoma City, Okla., and identified as Model DH.

Surrounding the drive shaft 50 is a shaft housing 64 and on one end of the drive shaft 50 is a counter weight 66 that helps produce the elliptical motion that drives the screens 28a, 28b. The drive shaft 50 is connected to the frame body 46 by a drive hub 68. The drive hub 68 transmits the motion created by the motor 26 from the drive shaft 50 on to the frame 20, the screens 28a, 28b, and eventually the material 12. This transferred motion when coupled with the screen slope, mesh size, motor means and material velocity profile results in the desired material separation for a particular application. As is well known in the art, appropriate dampening devices are used to dampen harmonics caused by the dual-screen device when it operates.

The improved method of the present invention for sorting and separating particles of a material using the dual-screen sorter 10 is set forth below. The motor is actuated and transmits an elliptical gyroscopic motion to the frame and attached screens.

The material 12 to be processed, such as dry cement, is supplied via the nozzle 58 to the inlet opening 62 of the dual-screen sorter 10, passing over the diverter device 30.

The cement material 12 travels over the arcuate deflector 60 and passes onto the upper ends of vibrating screens 28a, 28b. The cement material 12 then travels downwardly on the screens 28a, 28b with undesirable larger size particles remaining on the screens and dropping off the lower ends of the screens 28a, 28b for removal. Although not shown with particularity in the drawings, the larger undesired particles are passed down a conduit to a suitable receptacle (such as a dumpster or bin). The desirable smaller size particles pass downwardly through screens 28a, 28b and out of the dual-screen sorter 10 into the carrier 18.

Due to the elliptical motion imparted by the motor, the resulting vibrations will tend to advance the material 12 down one of the screens 28a, 28b and tend to impede the material flow down the other screen. If the drive mechanism is moving in essentially a clockwise direction, as in this embodiment, the screens 28a, 28b that moves with the flow will be at approximately a 6-degree angle since the material 12 will flow faster down screens 28a, 28b. Screens 28a, 28b will be set at approximately a 10-degree angle since the material will flow at a slower rate down screens 28a, 28b. The screen angles improve the efficiency of the particle sorting operation by providing more uniform material flow. In the current embodiment the screens 28a, 28b are bolted at the desired position and are re-bolted at a new angle to change the screen's angle as desired.

It should be noted that depending on the material being sized and separated, the necessary slope of the screens 28a, 28b is within the wide range from near three degrees to about sixty degrees. When it is desired to utilize particle dual-screen sorter 10 in a different application requiring a different screen slope, different bolting arrangements are used.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined.

What is claimed is:

1. An apparatus for sorting particles of a material, comprising:

a frame;

a drive assembly attached to the frame to induce gyroscopic vibratory motion of the frame in a selected rotational direction;

adjacent first and second inclined screens affixed to the frame, the screens each sloping downwardly away from an intermediate ridge, wherein the first inclined screen extends at a first angle with respect to a horizontal plane and the second inclined screen extends at a different, second angle with respect to the horizontal plane;

wherein material dropped onto the intermediate ridge separates into a first stream passing along the first inclined screen and a second stream passing along the second inclined screen;

wherein the first and second angles are selected in relation to the vibratory motion of the frame so that the first and second streams each move at substantially the same velocity along the respective first and second inclined screens; and wherein the intermediate ridge comprises a diverter member with opposing first and second radiused surfaces to transition the flow of the material from an initial substantially vertical flow into the respective first and second streams.

2. The apparatus of claim 1, wherein the first and second inclined screens each have a plurality of screen apertures of selected size so that particles within the first and second streams smaller than the selected size pass through the screen apertures and particles larger than the selected size traverse the respective lengths of the first and second inclined screens.

3. The apparatus of claim 1, further comprising a stand which supports the frame.

* * * * *